(12) United States Patent
Arai et al.

(10) Patent No.: US 7,261,854 B2
(45) Date of Patent: Aug. 28, 2007

(54) INSERT MOLDING TECHNIQUE

(75) Inventors: Tsuyoshi Arai, Kariya (JP); Masayuki Furuhashi, Kariya (JP)

(73) Assignee: DENSO Corporation, Kariya (JP)

( * ) Notice: Subject to any disclaimer, the term of this patent is extended or adjusted under 35 U.S.C. 154(b) by 204 days.

(21) Appl. No.: 10/781,346

(22) Filed: Feb. 18, 2004

(65) Prior Publication Data

US 2005/0035489 A1 Feb. 17, 2005

(30) Foreign Application Priority Data

Feb. 19, 2003 (JP) ............................ 2003-041626

(51) Int. Cl.
*B29C 43/18* (2006.01)
*B29C 51/10* (2006.01)

(52) U.S. Cl. ...................... 264/515; 264/230; 264/275; 264/516

(58) Field of Classification Search ...................... None
See application file for complete search history.

(56) References Cited

U.S. PATENT DOCUMENTS

| | | | | |
|---|---|---|---|---|
| 3,313,084 A | * | 4/1967 | Forman | 53/428 |
| 3,909,504 A | * | 9/1975 | Browne | 174/52.2 |
| 4,213,933 A | * | 7/1980 | Cambio | 264/515 |
| 4,695,926 A | * | 9/1987 | McDermott | 361/736 |
| 4,975,311 A | * | 12/1990 | Lindgren | 428/156 |
| 5,098,498 A | * | 3/1992 | Hale et al. | 156/213 |
| 5,151,147 A | * | 9/1992 | Foster et al. | 156/244.12 |
| 5,219,513 A | | 6/1993 | Addeo et al. | |
| 5,234,105 A | * | 8/1993 | Sato et al. | 206/706 |
| 5,274,914 A | * | 1/1994 | Kitamura et al. | 29/841 |
| 5,285,619 A | * | 2/1994 | Jones | 53/431 |
| 5,407,865 A | * | 4/1995 | Glovatsky et al. | 29/841 |
| 5,739,463 A | * | 4/1998 | Diaz et al. | 174/35 R |
| 6,506,328 B1 | * | 1/2003 | Baeskow | 264/255 |
| 6,708,401 B2 | * | 3/2004 | Miyakawa et al. | 29/832 |

FOREIGN PATENT DOCUMENTS

| | | |
|---|---|---|
| JP | 55-108937 | 7/1980 |
| JP | 2-175131 | 7/1990 |
| JP | 3-175014 | 7/1991 |
| JP | 7-134226 | 5/1995 |
| JP | 8-290464 | * 11/1996 |
| JP | 9-61253 | 3/1997 |
| JP | 2002-243557 | 8/2002 |

OTHER PUBLICATIONS

Mar. 2, 2007 Office Action issued in corresponding JP Application No. 2003-041626 and translation.

* cited by examiner

*Primary Examiner*—Edmund H. Lee
(74) *Attorney, Agent, or Firm*—Harness, Dickey & Pierce, PLC

(57) ABSTRACT

An insert component (2) is located at a predetermined position between a pair of halves of a mold (1) in an open state while being held by a support (12) for holding the insert component (2) outside the mold. A tubular molten resin (4) is extruded through a die (3) between the pair of halves of the mold (1) to dispose the insert component (2) in the interior space (13) of the molten resin (4). By clamping the mold (1), the insert component (2) is covered with the tubular molten resin (4) in conformity with the contour thereof to result in an insert-mold product (20).

9 Claims, 5 Drawing Sheets

INSERT MOLDING TECHNIQUE

TECHNICAL FIELD

The present invention relates to an insert molding technique for producing an insert-mold product obtained by covering an insert component with a resinous material and shaping the resinous material.

BACKGROUND ART

The insert molding by an injection molding method has been widely used in the prior art, in which an insert component is covered with resinous material in conformity with the contour of the former.

Generally, in the injection molding method, an insert component is located and fixed at a predetermined position within a cavity of a mold made, for example, of metal and is clamped in this state. Then, molten resin injected from a nozzle of a molding machine is filled in the cavity via a sprue, a runner and a gate to cover the outer circumference of the insert component in conformity with the cavity-forming surface, thus forming the insert-mold product.

In the above-mentioned injection molding method, however, it is necessary to apply and maintain a high pressure in the interior of the mold after the molten resin has been filled in the cavity, for the purpose of ensuring the accuracy of the contour of the mold product while complementing the volume contraction of the molten resin accompanied with the solidification thereof.

Accordingly, as the mold must have a high mechanical strength durable against such a high pressure, there is a problem in that a cost of the mold is high.

Also, as the insert component disposed in the cavity is exposed to the high pressure, there is another problem in that it is impossible to directly carry out the insert molding while using a relatively fragile component as an insert component, such as a glass pipe or a bare chip.

DISCLOSURE OF THE INVENTION

In view of the above-mentioned problems, an object of the present invention is to provide an insert molding technique using an inexpensive mold and capable of insert-molding a fragile component.

To achieve the above object, according to one aspect of the present invention, an insert molding technique for shaping an insert-mold product covered with resinous material on the outer circumference of an insert component is provided, comprising an arrangement step for locating the insert component within the interior space of the resinous material through an opening formed at least one end thereof, and a shaping step for covering the insert component with the resinous material to shape the latter in conformity with the contour of the former by at least one of heating, air suction and pressure due to clamping.

According to the inventive technique, it is possible to cover and shape the resinous material on the insert component by at least one of heating, air suction and pressure due to the clamping, while disposing the insert component within the interior space of the resinous material having an opening at least end thereof.

Accordingly, as the follow-up step for maintaining a high pressure as in the injection molding is unnecessary, a mold having a high mechanical strength durable against a high pressure is not needed and this reduces the cost of the mold.

Also, it is possible to carry out the insert molding while using a fragile component, that may be broken under a high pressure, as an insert component.

In the present invention, the resinous material and the insert component are preferably partially welded to each other by welding means simultaneously with or after the shaping step. By partially welding the resinous material covering the insert component to the insert component, it is possible to seal the insert component with the resinous material in an airtight manner while using the welding means.

In this case, the welding means preferably generates one of heat, a laser beam and an ultrasonic wave. If at least one of them is used, the resinous material is welded to the insert component so that the insert component is covered with the resinous material in an airtight manner.

Preferably, the insert molding technique further comprises a locating step for locating the insert component at a predetermined position between a pair of halves of a mold in an open state by a support for holding the insert component outside of the mold wherein, in the arrangement step, the resinous material is extruded in a molten state as a tube through a die between the pair of halves of the mold, and the insert component is located in the interior space of the tube and, in the shaping step, the mold is clamped to cover the insert component with the tubular resinous material in conformity with the contour of the insert component.

As described above, by extruding the molten resinous material in a tubular form between the halves of the mold, the insert component located in advance between the halves of the mold enters the interior space of the tubular resinous material from an extrusion end thereof. In this state, the mold is clamped to cover the insert component with the resinous material in conformity with the contour thereof. According to this technique, as the follow-up step for maintaining a high pressure is unnecessary contrarily to the conventional injection molding, it is possible to reduce the mold cost as well as to insert-mold a fragile component.

Also, as the resinous material covers the insert component by pressing the mold to the resinous material, it is possible to improve the contour accuracy of the insert-mold product if a contact surface of the mold with the resinous material has a relief corresponding to the contour of the insert-mold product.

According to the present invention, after the arrangement step, a shaping step may follow, in which an extrusion-side opening of the tubular resinous material is brought into contact with part of the insert component or the support and closed and, by sucking air in the interior space of the resinous material, the insert component is covered with the tubular resinous material and shaped in conformity with the contour of the former.

If the extrusion-side opening of the tubular resinous material is closed as described above, it is possible to cover the insert component with the resinous material by sucking air from the interior space of the resinous material in which the insert component is arranged.

Also, by sucking air, it is possible to reduce an amount of air remaining between the insert component and the molten resin, Accordingly, even if the range of applied temperature is wide, it is possible to reduce the generation of cracking, or other problems, originated from the residual air.

This shaping step by the air suction is preferably carried out prior to or simultaneously with the clamping. In the shaping step by the air suction, the resinous material at most roughly covers the insert component along the contour thereof. Accordingly, when there is the demand for a high accuracy of the contour of the insert-mold product, or a wall thickness of the resinous material varies relative to the contour of the insert component, the clamping is preferably carried out in addition to the shaping step by the air suction. As the clamping is carried out while the resinous material roughly covers the insert component along the contour thereof if the air suction is carried out prior to or simultaneously with the clamping, it is possible to reduce failures, such as burrs, resulting in an improvement in the production yield of the insert-mold product.

According to the present invention, the shaping step may follow the arrangement step, wherein the tubular resinous material is heated to cover the insert component in conformity with the contour of the latter prior to or simultaneously with the clamping. As the resinous material shrinks, under heating to roughly cover the insert component along the contour thereof, if the clamping is carried out in this state, it is possible to reduce the failures, such as burrs, resulting in an improvement in the production yield of the insert-mold product.

Also, according to the present invention, the welding means is preferably provided at a predetermined position of the mold. As the welding means is provided in the mold in this case, it is possible to carry the shaping step together with the welding, resulting in the reduction of production process.

Preferably, the insert molding technique further comprises a extrusion step for extruding a parison which is the molten resinous material between a pair of halves of a mold through a die, and a primary molding step for forming the resinous material having the interior space with one opening at one end thereof by clamping the mold to bring the parison into contact with a forming surface of the die while blowing air into the parison wherein, in the arrangement step, the resinous material produced through the primary molding step is removed from the mold and the insert component is inserted into the interior space from the opening while being fastened to a fastening section, and in the shaping step, the resinous material is heated and shrunk after the arrangement step to cover the insert component in conformity with the contour thereof.

By locating the insert component in the interior space of the resinous material formed by the air blow of the parison and heating the resinous material in this state, it is possible to shrink the resinous material by heating and to cover the insert component therewith along the contour thereof. Accordingly, also in this technique, the follow-up step for maintaining a high pressure is unnecessary contrarily to the conventional injection molding, whereby it is possible to reduce the mold cost and to insert-mold a fragile component.

Also, as the resinous material is drawn by the blowing of the parison, an amount of shrinkage when the resinous material is heated is large to easily cover the insert component along the contour thereof.

According to the present invention, the resinous material obtained by the primary molding step may be disposed in a second mold separate from the former mold, and clamped by the second mold while being heated and partially fixed with a fastening section of the second mold to cover the insert component in conformity with the contour thereof. By clamping the resinous material softened by the heating by means of the second mold having the forming surface corresponding to the contour of the insert-mold product, it is possible to improve the contour accuracy of the insert-mold product.

Also, according to the present invention, the resinous material may cover the insert component in conformity with the contour thereof by the heating while sucking air from the opening of the resinous material obtained by the primary molding. Also in this case, as the resinous material softened by the heating covers the insert component in conformity of the contour thereof by the air suction, it is possible to improve the contour accuracy of the insert-mold product.

Also, by the air suction, it is possible to reduce the residual air between the insert component and the molten resin. Thus, even if the range of applied temperature is wide, it is possible to reduce the generation of cracking, or other problems, originated from the residual air.

According to the present invention, the welding means may be provided in the fastening section. In this case, as the welding means is provided in the fastening section, it is possible to carry out the welding together with the shaping step, resulting in a shortening of the production process.

According to the present invention, a preliminarily prepared heat-shrinkable tube may be used in place of the resinous material obtained by the primary molding. Even if the preliminarily prepared heat-shrinkable tube is used, it is possible to cover the insert component in conformity with the contour thereof due to the shrinkage of the heat-shrinkable tube. As the heat-shrinkable tube is softened by the heating at this time, it is also possible to apply the heat-shrinkable tube with pressure by the clamping to improve the contour accuracy of the insert-mold product. Further, if the open end of the heat-shrinkable tube is closed by a heat press or others, it is possible to reduce the residual air between the insert component and the resinous material by means of the air suction with the heating, resulting in the improvement in the contour accuracy of the insert-mold product.

The present invention will be more clearly understood by the preferred embodiments of the present invention described below with reference to the attached drawings.

BRIEF DESCRIPTION OF THE DRAWINGS

FIGS. 1A to 1D are schematic illustrations for explaining the respective steps of an insert molding technique according to a first embodiment of the present invention, wherein FIG. 1A shows a positioning step, FIG. 1B shows an arrangement step, FIG. 1C shows a shaping step, and FIG. 1D shows an insert-mold product thus formed;

FIGS. 3A to 3D are schematic illustrations for explaining the respective steps for forming a primary mold product in an insert molding technique according to a second embodiment of the present invention, wherein FIG. 3A shows that molten resin is extruded, FIG. 3B shows that the molten resin is clamped, FIG. 3C shows that the molten resin is swollen by air blowing, and FIG. 3D shows a primary mold product thus produced;

FIGS. 4A to 4C are schematic illustrations for explaining the respective steps of the insert molding technique according to the second embodiment subsequent to the arrangement step, wherein FIG. 4A shows an arrangement step, FIG. 4B shows a shaping step, and FIG. 4C shows an insert-mold product; and FIGS. 5A to 5C are schematic illustration for explaining the respective steps of the insert molding technique according to a third embodiment of the present invention, wherein FIG. 5A shows an arrangement step, FIG. 5B shows a shaping step and FIG. 5C shows a welding step.

BEST MODE FOR CARRYING OUT THE INVENTION

The preferred embodiments of the present invention will be described below based on the attached drawings.

(First Embodiment)

Figure 1A:
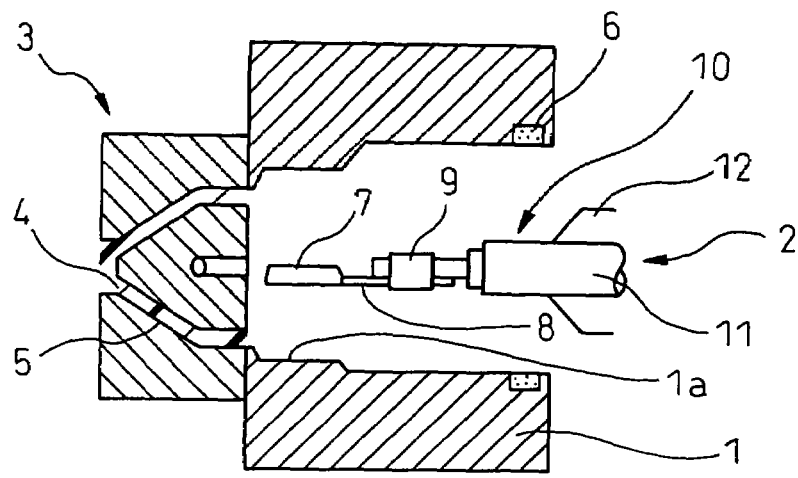
Figure 1B:
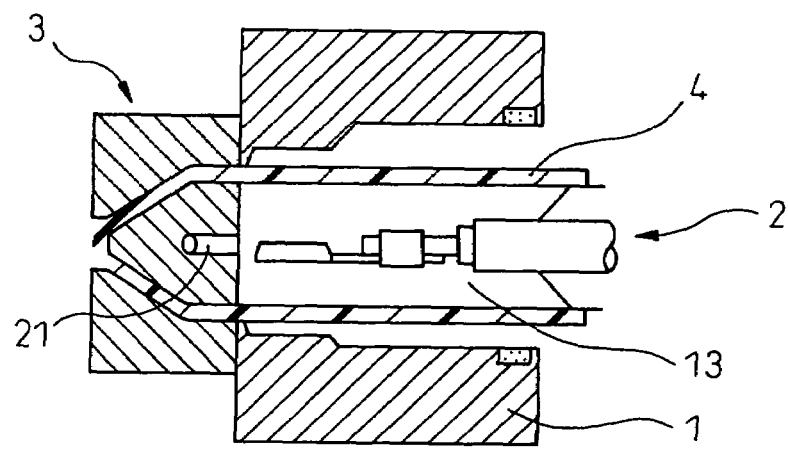
Figure 1C:
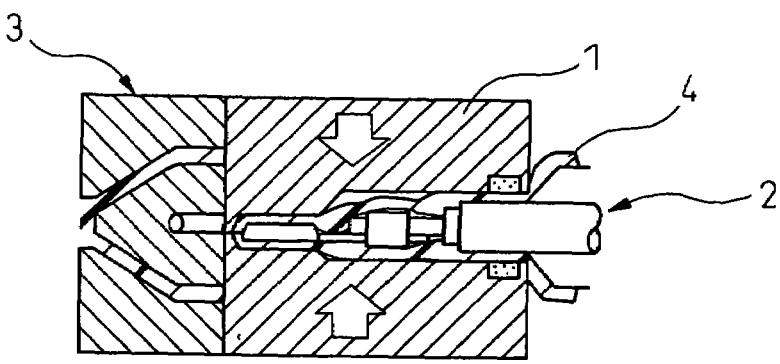
Figure 1D:
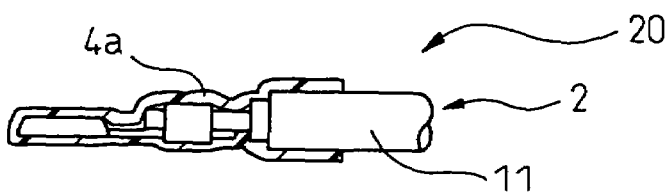

FIGS. 1A to 1D are schematic illustrations for explaining the respective steps of an insert molding technique according to a first embodiment of the present invention, wherein FIG. 1A shows a positioning step, FIG. 1B shows an arrangement step, FIG. 1C shows a shaping step, and FIG. 1D shows an insert-mold product thus formed. In this regard, the insert molding technique according to this embodiment uses an extrusion molding method.

First, as shown in FIG. 1A, a mold 1 is prepared, and a positioning step is carried out for locating an insert component 2 at a predetermined position in the mold 1 in an open state.

The mold 1 consists of a pair of halves, each having a forming surface 1a corresponding to the contour of an insert-mold product, whereby molten resinous material is pressed by the forming surfaces 1a when the mold is clamped, and is imparted with a predetermined shape. As shown in FIG. 1A, the mold 1 is provided with a die 3. The die 3 has a shaping section 5 having a predetermined shape for extruding the molten resin 4 of a tubular cross-section into a space between the pair of halves of the mold 1. In this regard, while thermoplastic resin or an alloy thereof is preferably used as the molten material 4, other materials may be selectively used for this purpose provided it is applicable for the extrusion molding. In this embodiment, heat-resistant polybutylene terephthalate (PBT) is used as an example.

At a predetermined position of the mold 1, a heater 6 used as welding means is embedded, the effect of which will be described later.

In this embodiment, the insert component 2 is constituted by a lead 8 carrying an IC chip 7 thereon and a cable 10 electrically connected by a connection 9 to the lead 8 by welding or caulking. Areas of the cable 10 other than the connection 9 to the lead 8 are covered with resinous material such as thermoplastic elastomer (TPEE).

The insert component 2 is held by a support 12 in a predetermined portion thereof not covered and shaped with the molten resin 4, and is disposed at a predetermined position between the pair of halves of the mold 1 by means of a robot or the like having the support 12. At this time, the insert component 2 is located and fixed to a position at which the insert component 2 is inserted and disposed into the tube of the molten resin 4 when the molten resin 4 is extruded as described later. In this regard, the support 12 is, of course, located out of the mold 1 so that it is not clamped between the pair of halves of the mold 1 during the clamping motion.

Next, after the insert component 2 has been located at the predetermined position, the arrangement step is carried out, in which the molten resin 4 is extruded from the die 3 into a space between the pair of halves of the mold 1 while the mold 1 is open, and the insert component 2 is disposed in the interior space 13 as shown in FIG. 1B.

The molten resin 4 extruded from the die 3 has a tubular cross-sectional shape due to a contour of the die 3 described above, and is open at a front end thereof extruded from the die 3. At this time, as the insert component 2 is preliminarily located and fixed at a position to be within the tubular interior space 13 of the molten resin 4, it is inserted into the interior space 13 from the opening of the molten resin 4.

When the mold 1 is clamped relative to the molten resin 4 with the insert component 2 being located in the interior space 13, a shaping step is carried out in which the insert component 2 is covered with the molten resin 4 roughly in conformity with the contour of the former as shown in FIG. 1C.

At this time, as the mold 1 has a forming surface 1a corresponding to the contour of the insert-mold product, on a contact surface with the molten resin 4, the molten resin 4 changes its shape in conformity with the forming surface 1a of the mold 1 while discharging air into the interior space 13 of the molten resin 4 from the opening by the clamping. According to the insert molding technique of this embodiment, as the molten resin 4 is shaped by the mold 1 having the forming surface 1a corresponding to the contour of the mold product, it is possible to improve the dimensional accuracy of the contour of the insert-mold product thus formed.

After being cooled, the insert-mold product 20 shown in FIG. 1D is removed from the mold 1.

As described above, as the follow-up step for maintaining a high pressure is unnecessary when the resinous material is fed to the insert component 2 and shaped in conformity therewith when the insert molding technique according to this embodiment is used, there is no need for using a high-strength mold, whereby the cost of the mold can be reduced.

Also, a fragile part such as a bare chip or others may be used as an insert component 2.

In this regard, the heater 6 is embedded at a predetermined position in the mold 1 as a welding means. Thus, the heater 6 is heated simultaneously with the clamping in the shaping step to weld a part of the insert component 2, such as a cover member 11 of the cable 10, together with the molten resin 4. As the molten resin 4 seals the insert component 2 in an airtight manner by the above-mentioned welding, the insulation at the connection 9 between thee IC chip 7 and the lead 8 is ensured. In this regard, the welding is preferably carried out simultaneously with the shaping step because the production process can be shortened, but it may be carried out after the shaping step.

According to this embodiment, while the heater 6 is embedded in the mold 1 as the welding means, it is not always provided in the mold 1. When the insert-mold product 20 cooled and removed from the mold 1 after the shaping step, a solidified resin 4a resulted from the molten resin 4 may be partially welded to the cover member 11 by using separate welding means.

In this embodiment, while the heater 6 is used as welding means, means other than the heater, such as that using a laser beam or ultrasound, may be employed, provided the molten resin 4 (or solidified resin 4a) and the insert component 2 could be partially welded together in an air-tight manner.

As shown in FIG. 1C, according to the insert molding technique of this embodiment, the covering and shaping of the molten resin 4 relative to the insert component 2 are carried out by the clamping. However, the covering and shaping of the molten resin 4 relative to the insert component 2 may be carried out by the heating prior to, or simultaneously with, the clamping. For example, a movable heater (not shown) is disposed between the tubular molten resin 4 and the mold 1 shown in FIG. 1B. After heating the molten resin 4 thereby, the movable heater is removed from the position between the molten resin 4 and the mold 1, and then the clamping is carried out. Alternatively, a drier is provided on a parting surface of the mold, and the molten resin 4 is heated thereby prior to or simultaneously with the clamping. Further, a heater is provided in the interior of the mold 1 itself, and the clamping is carried out while shaping the molten resin 4 by the heat thereof.

In this case, by heating the molten resin 4, the thermal shrinkage occurs in the molten resin 4 roughly in conformity with the contour of the insert component 2. Accordingly, as the deformation of the molten resin 4 becomes less than that occurring solely by the clamping, failures, such as burrs, generated during the clamping can be reduced to improve the yield of the insert-mold product 20.

Also, the covering and shaping of the molten resin 4 relative to the insert component 2 may be carried out by sucking air prior to or simultaneously with the clamping.

Figure 2:
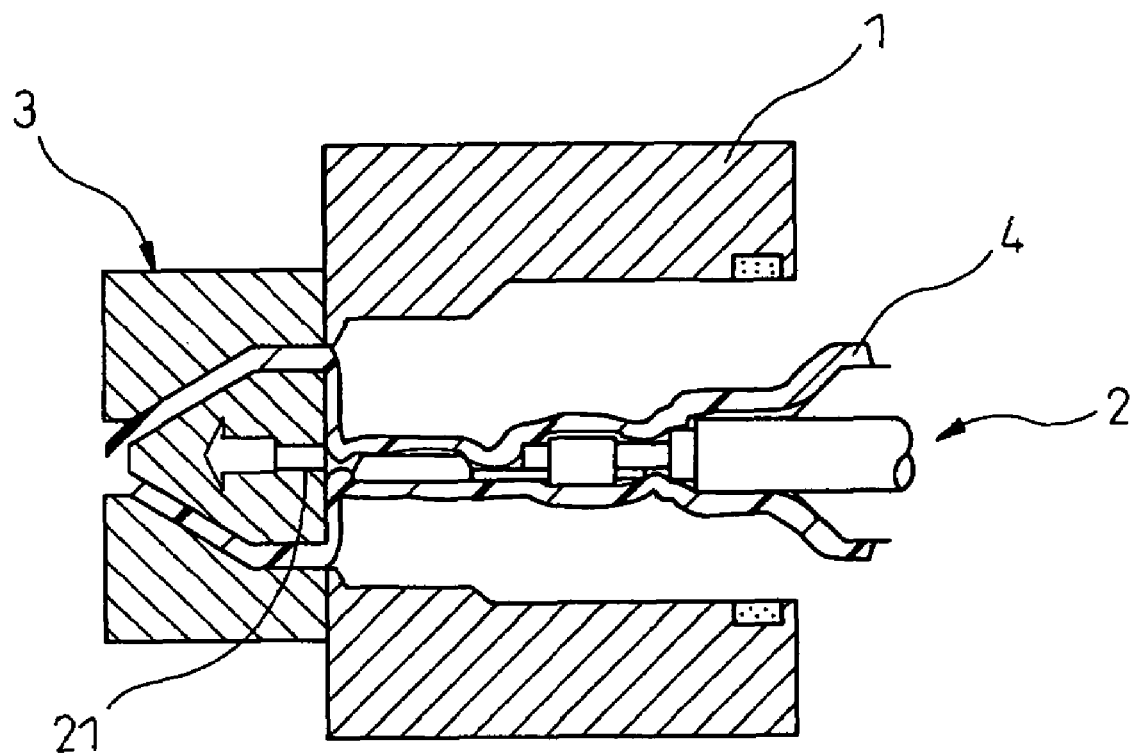
FIG. 2 is an illustration for explaining a shaping step by the air suction.

As shown in FIG. 1B, if the molten resin 4 extruded from the die 3 is brought into contact with part of the insert component 2 or the support 12 for holding the insert component 2 (in FIG. 1B, in contact with the support 12) to close the opening of the molten resin 4, it is possible to suck air in the interior space 13 of the molten resin 4 via an air-suction port 21 provided, for example, in the die 3, as shown in FIG. 2.

Accordingly, as shown in FIG. 2, the molten resin 4 is roughly shaped in conformity with the insert component 2 by the air suction. In other words, as an amount of deformation of the molten resin 4 becomes less during the clamping, the failures due to the clamping, such as burrs, are reduced to improve the yield of the insert-mold product 20.

Also, by the air suction, it is possible to reduce air remaining between the insert component 2 and the molten resin 4. For example, as the generation of cracks, or other problems, originated from the residual air when the applied temperature range is wide, becomes less, it is possible to enhance the insulation of the IC chip 7.

In this regard, instead of the clamping shown in FIG. 1C, at least one of the above-mentioned heating and air suction shown in FIG. 2 may be carried out. In this case, however, the molten resin 4 only roughly shaped relative to the insert component 2. Thus, at least one of the heating and air suction may be used when the accuracy of the contour dimension of the insert-mold product 20 is not so severely demanded, but the clamping is preferably adopted when the accuracy of the contour dimension of the insert-mold product 20 is severely demanded or a wall thickness of the molten resin 4 should be changed in places on the insert component 2.

(Second Embodiment)

Figure 3A:
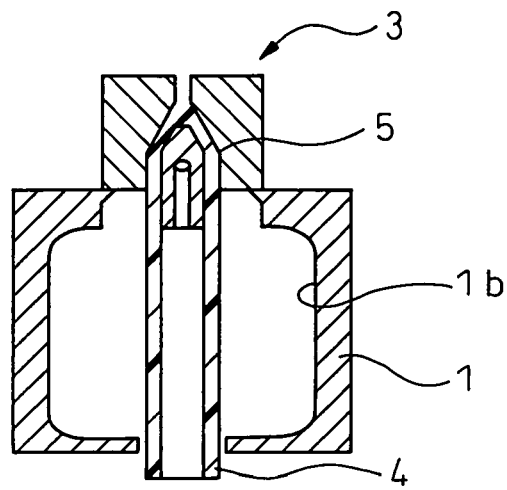
Figure 3B:
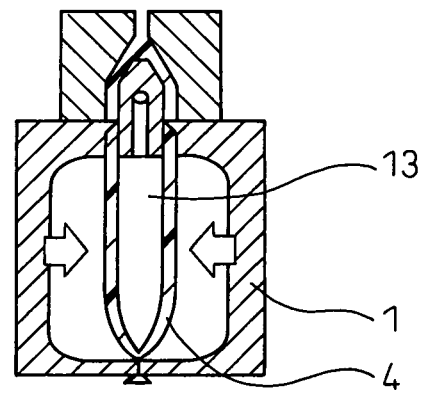
Figure 3C:
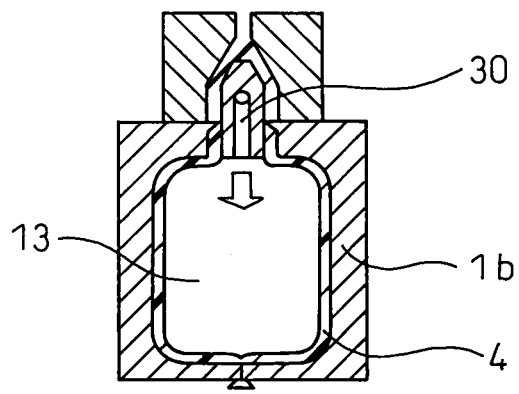
Figure 3D:
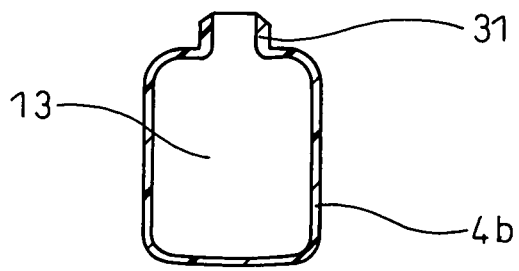
Figure 4A:
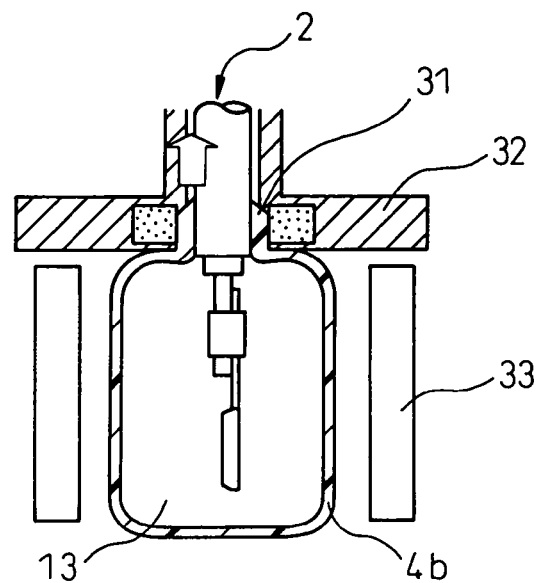
Figure 4B:
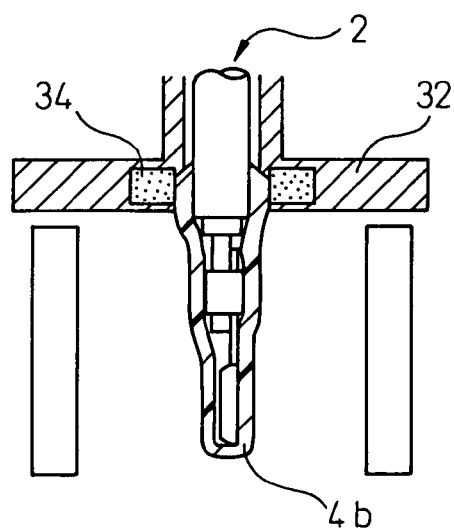
Figure 4C:
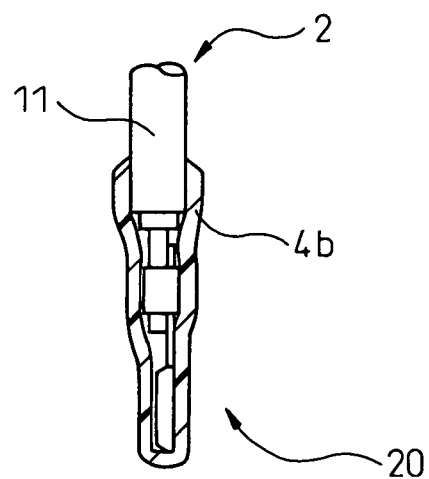

Next, a second embodiment of the present invention will be described based on FIGS. 3A to 3D and FIGS. 4A to 4C. FIGS. 3A to 3D illustrate steps before a resinous product (a primary mold product), in which an insert component is inserted, is formed, wherein FIG. 3A shows an extrusion step of molten resin, FIG. 3B shows a clamping step of the molten resin, FIG. 3C shows an air-blowing step, and FIG. 3D shows a primary mold product thus obtained. FIGS. 4A to 4C illustrate steps on and after an arrangement step, wherein FIG. 4A shows the arrangement step, FIG. 4B shows a shaping step and FIG. 4C shows an insert-mold product thus obtained.

Because the insert molding technique according to the second embodiment is common to the first embodiment in many items, the detailed description of the common items will be eliminated and the difference of the second embodiment from the first embodiment will be emphasized hereinafter.

In the second embodiment, the difference from the first embodiment is that resinous material, in which the insert component 2 is disposed, is primarily molded by the extrusion-blow molding method.

First, as shown in FIG. 3A, a mold 1 having a predetermined forming surface 1b is in an open state, to which is extruded molten resin 4 having a tubular cross-section (a so-called parison) through a shaping section 5 of a die 3 added to the mold 1. In this regard, resinous material used for the molten resin 4 is the same as in the first embodiment. The forming surface 1b of the mold 1 is in correspondence with the contour of the primary mold product described later.

Next, as shown in FIG. 3B, the mold 1 is clamped while protruding the extruded end of the molten resin 4 out of a side of the mold 1 opposite to the die 3. Thus, the interior space 13 of the molten resin 4 within the mold 1 is closed.

While maintaining the interior space 13 of the molten resin 4 in the closed state, air (indicated by an arrow in FIG. 3C) is blown into the interior space 13 of the molten resin 4 from an air-blowing port 30 provided, for example, in the die 3 as shown in FIG. 3C, whereby the molten resin 4 is drawn and brought into contact with the forming surface 1b of the mold 1. After the completion of air-blowing, the molten resin 4 is cooled and removed from the mold 1 as a bottle-shaped resinous product 4b (hereinafter referred to as a primary mold product 4b) having, for example, a fastener opening space 13 as shown in FIG. 3D.

Then, as shown in FIG. 4A, the arrangement step is carried out wherein while the outer circumference of the fastener opening 31 of the primary mold product 4b is fastened by a fastening section 32 of a fastener jig, the insert component 2 is inserted into the interior space 13 from the fastener opening 31 and located there.

After the arrangement step as shown in FIG. 4A, the shaping step is carried out wherein the circumference of the primary mold product 4b is heated by using a drier or a heater 33 such as an infrared heater, whereby the molten primary mold product 4b thermally shrinks to cover the insert component 2, in conformity therewith, as shown in FIG. 4B. As shown in FIG. 4C, the insert-mold product 20 covered with the shaped resinous primary mold product 4b is thus formed.

In such a manner, according to the insert molding technique of this embodiment, it is possible to form the insert-mold product 20 in which the insert component 2 is covered with the resinous primary mold product 4b having the contour in conformity with the insert component 2, without using the follow-up step for maintaining a high pressure. Therefore, as the mold having a high mechanical strength is unnecessary, it is possible to save the cost of mold. Also, as the insert component 2 is not exposed to a high pressure, it is possible to insert-mold a fragile component.

Moreover, according to this embodiment, as the resin of the primary mold product 4b in which the insert component 2 is located, is drawn by extrusion-blow molding, an amount of shrinkage is large during the heating, whereby the shaping step is easily carried out.

Preferably, the resinous primary mold product 4b and part of the cover member 11 for the cable 10 are welded together by welding means, provided in the fastening section 32, such as a heater 34 or others simultaneously with or after the shaping step. As the insert component 2 is sealed with the primary mold product 4b in an airtight manner thereby, it is possible to secure the insulation of the IC chip 7 or others. In this regard, if the welding is carried out simultaneously with the shaping step, the manufacturing process is preferably shortened. However, the welding means is not necessarily provided in the fastening section 32. By using a separate welding means, the primary mold product 4b and the cover member 11 are welded together at a predetermined portion of the insert-mold product 20 after the shaping step.

In the shaping step of this embodiment, the primary mold product 4b is shrunk by heat to cover the insert component 2 in conformity with the contour thereof. As shown in FIG. 4A, however, the insert component 2 may be covered with the primary mold product 4b in conformity with the contour thereof by sucking air from the interior space 13 of the primary mold product 4b from the fastener opening 31 of the primary mold product 4b in the direction shown by an arrow simultaneously with the heating. In this case, if the primary mold product 4b is softened by heating, it is possible to shape the primary mold product 4b in conformity with the contour of the insert component 2 by sucking air. As air in the interior space 13 of the primary mold product 4b is removed when the shaping step is carried out by sucking air, the primary mold product 4b is easily shaped in conformity with the contour of the insert component 2 to improve the contour accuracy of the insert-mold product 20. Also, as an amount of residual air between the primary mold product 4b and the insert component 2 can be reduced, the generation of cracks, originated from the air when the applied temperature range is wide, becomes less.

Also, by carrying out the heating together with the clamping during the shaping step, the insert component 2 may be covered with the primary mold product 4b in conformity with the contour thereof. In this case, the primary mold product 4b is located in a second mold (not shown) other than the mold 1 used in the primary molding, and the fastener opening 31 is fixed to a fastening section of the second mold. By clamping the second mold relative to the primary mold product 4b softened by the heating, it is possible to cover the insert component 2 with the primary mold product 4b in conformity with the contour of the former.

If the clamping is carried out simultaneously with the heating in the above-mentioned manner while using the second mold having a forming surface in correspondence to the contour of the insert component 20, it is possible to improve the contour accuracy of the insert mold product 20.

However, when there is no demand for high contour accuracy of the insert mold product 20, it is preferable to select the shaping step carried out solely by the heating or the combination of the heating with the air suction in view of the saving of the mold cost. In this regard, when the second mold having welding means in the fastening section is used, it is possible to weld the primary mold product 4b with the cover member 11 of the cable 10 simultaneously during or after the shaping step.

(Third Embodiment)

Figure 5A:
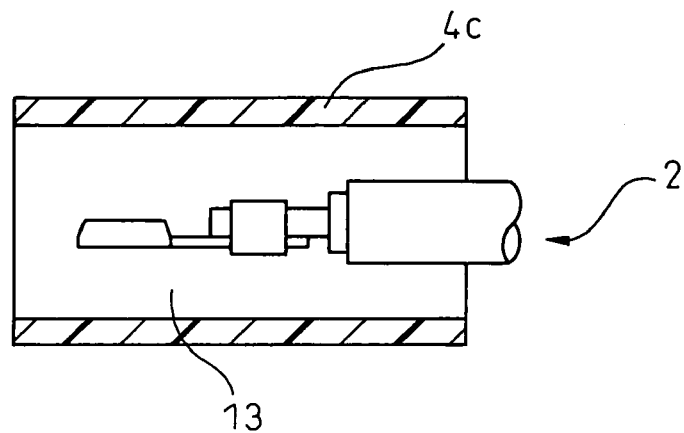
Figure 5B:
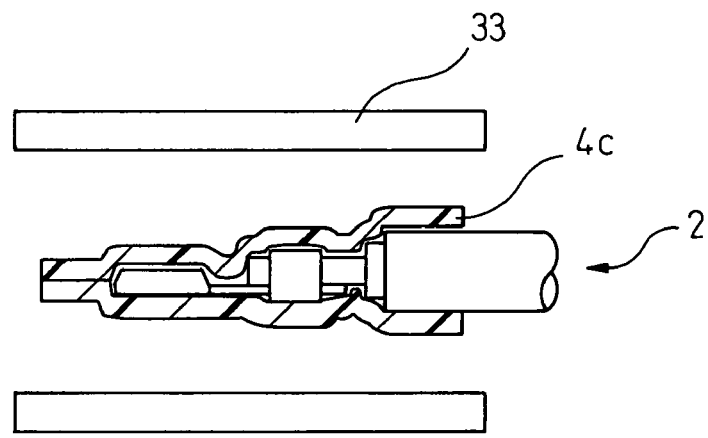
Figure 5C:
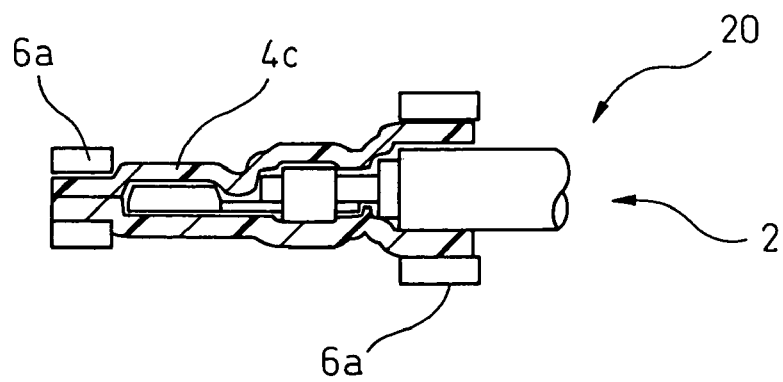

A third embodiment of the present invention will be described based on FIGS. 5A to 5C, wherein FIG. 5A shows an arrangement step, FIG. 5B shows a shaping step and FIG. 5C shows a welding step.

Because the insert molding technique according to the third embodiment is common to the second embodiment in many items, the detailed description of the common items will be eliminated and the difference of the third embodiment from the second embodiment will be emphasized hereinafter.

In the third embodiment, the difference from the second embodiment is that resinous material in which an insert component 2 is disposed, is not a primary mold product 4b produced by the extrusion molding method, but is a preliminarily prepared heat-shrinkable tube.

First, as shown in FIG. 5A, a heat-shrinkable tube 4c having openings at opposite ends is prepared as the resinous material, and a portion thereof not shaped with the insert component 2 is fixed by a fastening section (not shown). The insert component 2 is inserted into the interior space 13 of the heat-shrinkable tube 4c from one of the openings by means of a robot or others (not shown) until reaching the a predetermined position. The heat-shrinkable tube 4c may be made of thermoplastic resin or composite thereof, and in this embodiment, PBT is selected for this purpose as in the first and second embodiments.

As shown in FIG. 5B, if the circumference of the heat-shrinkable tube 4c is heated by a heater 33 while maintaining this state, the heat-shrinkable tube 4c is shrunk and shaped in conformity with the contour of the insert component 2 to tightly cover the latter.

If the heat-shrinkable tube 4c having openings at opposite ends is used, as shown in FIG. 5C, the heat-shrinkable tubes 4c themselves or the heat-shrinkable tube 4c and the cover member 11 of the cable 10 are welded together by using a heating press 6a or others to seal the insert component 2 with the heat-shrinkable resinous tube 4c in an air-tight manner. In this regard, this is also true when the heat-shrinkable tube having a single opening at one end is used.

The insert component 2 may be covered with the heat-shrinkable tube 4c by the air suction together with the heating in the same manner as in the second embodiment using the primary mold product 4b. In this regard, in the case where the ends of the heat-shrinkable tube 4c are open, if the openings at opposite ends of the heat-shrinkable tube 4c are preliminarily closed by means of welding means except for a small hole for allowing air to be sucked, it is possible to suck air existing in the interior space 13 through the hole.

If the heat-shrinkable tube 4c is used in such a manner, it is possible to cover the insert component 2 in conformity with the contour thereof by heating and shrinking the heat-shrinkable tube 4c after disposing the insert component 2 within the interior space 13 of the heat-shrinkable tube 4c.

Accordingly, as the follow-up step for maintaining the high pressure is unnecessary, it is possible to save the mold cost. Also, it is possible to insert-mold a fragile component.

As the preparation of the primary mold product 4b is unnecessary if the heat-shrinkable tube 4c is used, it is possible to shorten the manufacturing process.

While the present invention has been described hereinabove based on the preferred embodiments, it should be noted that various changes and modifications are possible without departing from a scope of claim for patent and/or a gist of the present invention, by a person with ordinary skill in the art.

What is claimed is:

1. An insert molding technique for shaping an insert-mold product covered with resinous material on an outer circumference of an insert component, comprising opening a mold locating the insert component at a predetermined position in the mold when the mold is in the open state using a support for holding the insert component outside of the mold, extruding the resinous material in a molten state as a tube through a die into the mold, the insert component being located in the interior space of the tube, and closing the mold to clamp and to cover the insert component with the tubular resinous material in conformity with the contour of the insert component; wherein after the extruding step, the closing step follows, in which an extrusion-side opening of the tubular resinous material is brought into contact with part of the insert component or the support and closed, and by sucking air from the interior space of the resinous material, the insert component is covered with the tubular resinous material and shaped in conformity with the contour of the former.

2. An insert molding technique as defined by claim 1, wherein the air suction is carried out prior to or simultaneously with the closing of the mold.

3. An insert molding technique as defined by claim 1, wherein the closing step follows the extruding step, wherein the tubular resinous material is heated to cover the insert component in conformity with the contour of the latter prior to or simultaneously with the closing of the mold.

4. An insert molding technique as defined by claim 1, wherein welding means is provided at a predetermined position of the mold.

5. An insert molding technique for shaping an insert-mold product covered with resinous material on a outer circumference of an insert component, comprising
   opening a first mold
   extruding a parison, which is a molten resinous material, into the first mold through a die,
   closing the first mold; forming the resinous material having an interior space with one open end and one closed end by bringing the parison into contact with a forming surface of the first mold while blowing air into the parison,
   removing the resinous material from the first mold;
   inserting the insert component into the interior space from the open end while being fastened to a fastening section, and
   heating and shrinking the resinous material after the inserting step to cover the insert component in conformity with the contour thereof.

6. An insert molding technique as defined by claim 5, wherein the formed resinous material is disposed in a second mold separate from the first mold, and the formed resinous material is clamped by the second mold while being heated and partially fixed with a fastening section of the second mold to cover the insert component in conformity with the contour thereof.

7. An insert molding technique as defined by claim 5, wherein the resinous material covers the insert component in conformity with the contour thereof while sucking air from the open end of the resinous material.

8. An insert molding technique as defined by claim 5, wherein welding means is provided in the fastening section.

9. An insert molding technique as defined by claim 5, wherein a preliminary prepared heat-shrinkable tube is used in place of the resinous material obtained by the primary molding.

* * * * *